United States Patent [19]

Matsuda et al.

[11] Patent Number: 5,736,235
[45] Date of Patent: Apr. 7, 1998

[54] MAGNETIC RECORDING MEDIUM HAVING AT LEAST TWO MAGNETIC LAYERS WITH EASY AXES ORIENTED IN THE SAME DIRECTION

[75] Inventors: Yoshibumi Matsuda, Hachiouji; Masaaki Futamoto, Tsukui-gun; Yoshinori Miyamura, Nishitama-gun; Tokuho Takagaki, Yokohama; Hisashi Takano; Fumio Kugiya, both of Hachiouji; Takeshi Nakao, Sagamihara; Kyo Akagi, Fuchu; Mikio Suzuki, Kokubunji; Hirotsugu Fukuoka, Hitachioota; Takayuki Munemoto, Niihari-gun, all of Japan

[73] Assignee: Hitachi, Ltd., Tokyo, Japan

[21] Appl. No.: 740,708

[22] Filed: Aug. 6, 1991

[30] Foreign Application Priority Data

Aug. 20, 1990 [JP] Japan ................. 2-217048

[51] Int. Cl.$^6$ .................................................. G11B 5/66
[52] U.S. Cl. ................. 428/212; 428/213; 428/694 TM; 428/694 TS; 428/900
[58] Field of Search ...................... 428/694, 900, 428/611, 928, 668, 64, 65, 212, 213, 694 TM, 694 TS

[56] References Cited

U.S. PATENT DOCUMENTS

| | | | |
|---|---|---|---|
| 3,451,793 | 6/1969 | Matsushita | 428/611 |
| 4,429,016 | 1/1984 | Sugita | 428/692 |
| 4,636,448 | 1/1987 | Morita | 428/607 |
| 4,675,224 | 6/1987 | Hosokawa | 428/65 |
| 4,677,032 | 6/1987 | Robinson | 428/611 |
| 4,775,576 | 10/1988 | Bouchand et al. | 428/216 |
| 4,798,765 | 1/1989 | Ishizaka et al. | 428/336 |
| 4,810,592 | 3/1989 | Miyabayashi | 428/668 |
| 4,847,147 | 7/1989 | Aonuma et al. | 428/329 |
| 4,847,161 | 7/1989 | Rupp | 428/450 |
| 4,966,821 | 10/1990 | Kawashima et al. | 428/694 |
| 5,024,903 | 6/1991 | Mizukami | 428/694 |
| 5,080,948 | 1/1992 | Morita et al. | 428/64 |
| 5,118,654 | 6/1992 | Shinohara et al. | 428/336 |

FOREIGN PATENT DOCUMENTS

| | | |
|---|---|---|
| 3805787 A1 | 7/1989 | Germany . |
| 56-127929 | 10/1981 | Japan . |
| 56-127930 | 10/1981 | Japan . |

OTHER PUBLICATIONS

"Longitudinal Media For 1 Gb/in$^2$ Areal Density", Yogi, et al. IEEE Transactions of Magnetics, Vo. 26, No. 5, Sep. 1990, pp. 2271–2276.

*Primary Examiner*—Stevan A. Resan
*Attorney, Agent, or Firm*—Fay, Sharpe, Beall, Fagan, Minnich & McKee

[57] ABSTRACT

A magnetic recording medium, its fabrication method, and a magnetic recording apparatus in which both saturation induction and coercive force of a magnetic film is made high as they are near a surface of the recording medium. A high density information recording can be made higher than 50 kFCI in linear recording density even for spacing around 0.2 µm.

15 Claims, 9 Drawing Sheets

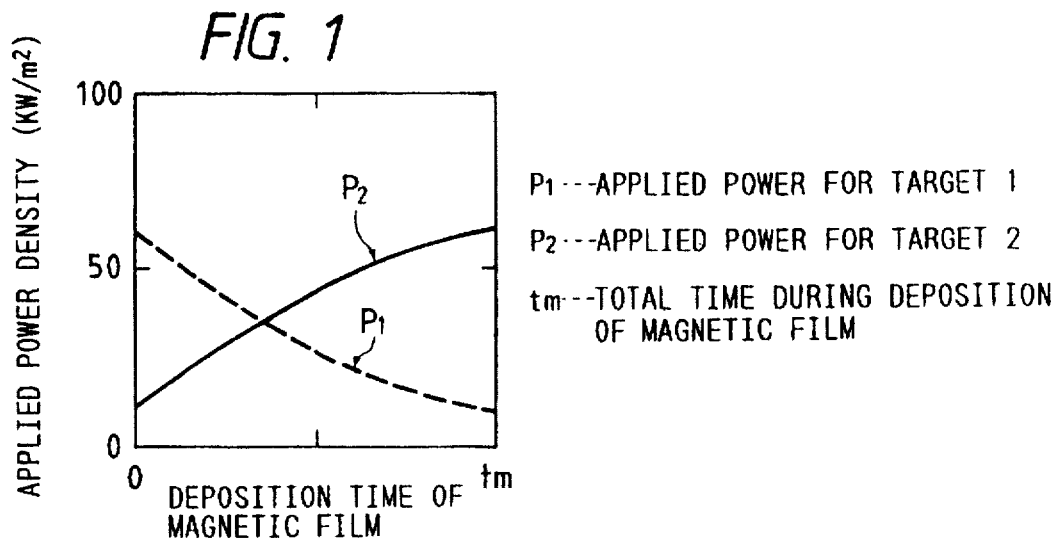
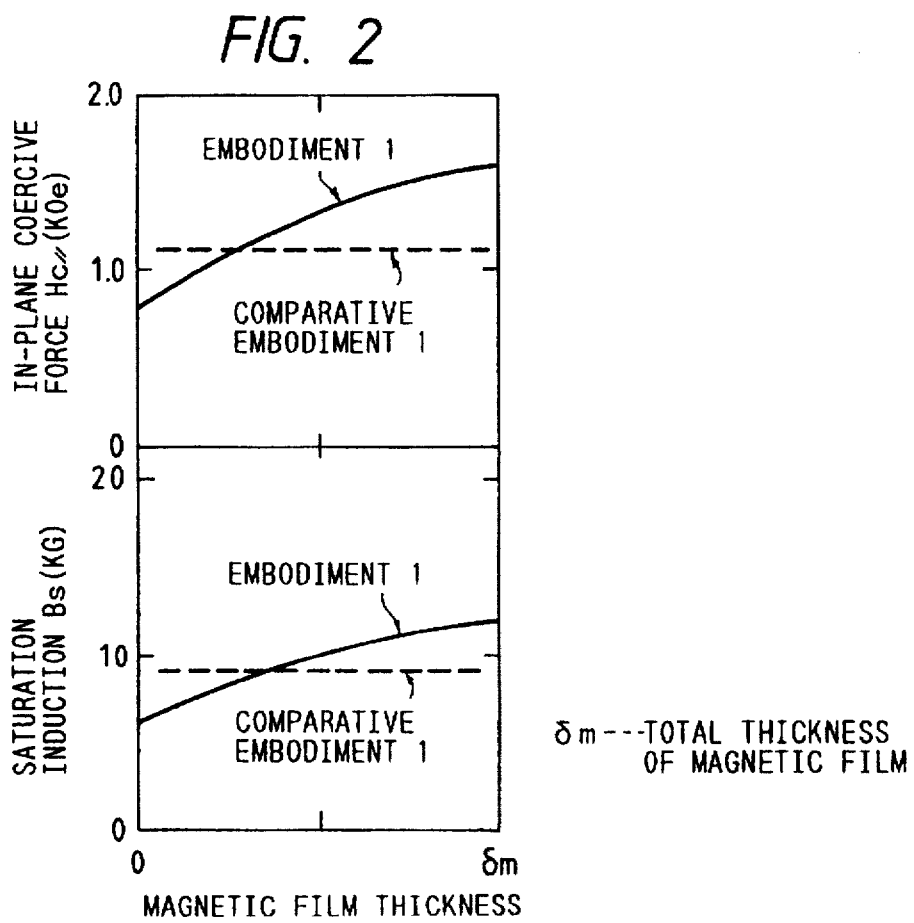

δm --- TOTAL THICKNESS OF MAGNETIC FILM (INCLUDING INTERLAYERS)

tm --- TOTAL TIME DURING DEPOSITION OF MAGNETIC FILM (INCLUDING INTERLAYERS)

δm --- TOTAL THICKNESS OF MAGNETIC FILM (INCLUDING INTERLAYERS)

MAGNETIC RECORDING MEDIUM HAVING AT LEAST TWO MAGNETIC LAYERS WITH EASY AXES ORIENTED IN THE SAME DIRECTION

BACKGROUND OF THE INVENTION

The present invention relates to a magnetic recording medium, its fabrication method, and a magnetic recording apparatus for magnetic disks, magnetic tapes, magnetic cards, and other magnetic information means, and more particularly concerns a magnetic recording medium, its fabrication method, and a magnetic recording apparatus suitable to high density information recording.

In general, a magnetic recording medium is fabricated by forming a magnetic film to proper thickness on a nonmagnetic substrate directly or via an underlayer. The magnetic film is usually made of a main component, such as cobalt or similar ferromagnetic metals, plus an additive, such as chrome, tantalum, platinum, or similar metal.

If the magnetic recording medium has recording at higher density than a certain limit, the signal-to-noise ratio tends to decrease to a great extent. This is mainly due to very narrow region for leakage flux induced from the recording medium as the high density recording makes the minimum unit of recording magnetization too small. If the spacing between the magnetic head and the recording medium can be made extremely close, however, the signal-to-noise ratio can be increased even for the narrow leakage flux region. But, the spacing cannot be made narrower than a certain limit by the present magnetic head floating technique.

There have been a few prior attempts for increasing the recording density under the present spacing condition. One example is that the content of the added metal on the surface side of the recording medium is decreased to increase the saturation induction on that portion. (As examples, see the Japanese Patent Application Laid-Open No. 56-127929.)

The above mentioned attempts can be summed up as the saturation induction or the coercive force on the surface side of the recording medium to enhance the magnetic coupling between the magnetic head and the magnetic medium, thereby improving the signal-to-noise ratio. However, the industrial demand for the high density recording is so high and strict that such easy measures cannot meet it in any way. Further advanced magnetic recording media are strongly desired to appear.

SUMMARY OF THE INVENTION

In view of the foregoing, it is a general object of the present invention to provide an improved magnetic recording medium, its fabrication method, and a magnetic recording apparatus capable of recording information in a very high density, particularly in a linear recording density as high as 50 kFCI or more under a spacing condition around 0.2 µm which is a limit of the present magnetic head floating technique.

It is another object of the present invention to provide a newly structured magnetic recording medium, its fabrication method, and a magnetic recording apparatus having the medium used therein which can individually control saturation induction and coercive force of some parts of magnetic film by a new method in addition to the control of content of added metal.

The above mentioned general object of the present invention is accomplished in a way that both saturation induction and coercive force of a magnetic film is made high at a position as the position is near a surface of a recording medium. In other words, the general object is accomplished in a way that both the saturation induction and coercive force of the magnetic film is decreased from the surface of the recording medium toward a nonmagnetic substrate. With such inclined distributions in the magnetic characteristics, the magnetic recording apparatus can be constructed to have higher linear recording density than 50 kFCI even if the spacing between the end of the magnetic head and the magnetic recording medium is around 0.2 µm in the write and read modes of operation. It should be noted that decrement of the coercive force is preferably higher than that of the leakage flux from the end of the magnetic head.

The inclined magnetic characteristic distributions mentioned above are not accomplished by the conventional methods in which the content of the added metal is controlled alone. Although the saturation induction and coercive force of a magnetic material can be changed by varying the content of the added metal, the changes of the saturation induction and coercive force are really reverse each other. Therefore, the coercive force is decreased if the content of the added metal is made less to increase the saturation induction. Conversely, the saturation induction is decreased if the content of the added metal is made more to increase the coercive force.

In order to overcome such a difficulty, the inventors investigated about possibilities of controlling the saturation induction and coercive force on any position of magnetic film to any desired values with respect to combination of magnetic materials of different kinds or combination of magnetic material with nonmagnetic material and optimization of conditions for forming the magnetic film. As result, they obtained the following some solutions.

As an example, the inventors compared a cobalt group alloy containing chrome of 15 atm-% and tantalum of 5 atm-% with another cobalt group alloy containing chrome of 10 atm-% and platinum of 5 atm-%. The latter alloy had greater values of both the saturation induction and coercive force than the former. If parts or all of the metal elements forming the alloy are different as such, it happens often that both the saturation induction and coercive force of one alloy are greater or lower than those of the other one. This means that the magnetic thin film can be formed by selecting from among numbers of alloys two or more alloys which are different little by little both in the saturation induction and coercive force.

The magnetic thin film can be formed in a way that magnetic materials being least both in the saturation and coercive force is piled on a substrate first, and other magnetic materials being a little higher both in the saturation and coercive force are piled on it one by one, using, for example, a sputtering system. The completed magnetic film has a staircase-like magnetic distribution that both the saturation induction and coercive force are highest on the surface layer and decreased toward the substrate.

A similar magnetic distribution can be made by adjusting amount of sputtering in a way that a magnetic material having both of higher saturation induction and coercive force and the other magnetic material having both of lower saturation induction and coercive force are simultaneously sputtered so that a content of the latter magnetic material should be made relatively high on the substrate side and that of the former one should be made relatively low on the surface side. The completed magnetic film has a magnetic distribution that both the saturation induction and coercive force are decreased depthwise.

Another similar magnetic distribution can be made by alternately combining a multiple of layers of a magnetic material having a desired saturation induction and coercive force with a multiple of layers of a nonmagnetic material. That is, a magnetic medium laminated of a multiple of magnetic layers separated by a multiple of nonmagnetic layers can be made by alternately combining to pile on a substrate a multiple of layers of a magnetic material having a desired saturation induction and coercive force with a multiple of layers of a nonmagnetic material. In forming the magnetic layers and the nonmagnetic layers, amounts of sputtering the magnetic material and nonmagnetic material are adjusted so that thickness of the magnetic layer should be made thick on the surface side and thin on the substrate side, and conversely the thickness of the nonmagnetic layer should be made thin on the surface side and thick on the substrate side. The completed magnetic film has a magnetic distribution that both the saturation induction and coercive force are effectively decreased from the surface side toward the substrate side.

For cobalt group alloys containing chrome as additive metal, as mentioned above, increasing the content of chrome makes the coercive force high, but makes the saturation induction low. However, according to the results of the experiment made by the inventors, with the substrate temperature gradually increased with growth of the magnetic film, an effect of increase of the coercive force with the temperature increase appears distinctively. That can control the coercive force on the surface side of the completed magnetic film to a desired value together with the saturation induction. Thus, even if only one kind of magnetic material is used individually, the magnetic distribution of the completed magnetic film can be controlled to a desired shape by adjusting the substrate temperature in piling the material. The substrate temperature has to be gradually increased preferably from room temperature to not higher than 300° C., or further preferably from room temperature to 100° to 300° C.

Forming the magnetic film can be made with use of a sputtering technique, a vacuum evaporation technique, a plating technique, or any other adequate technique. The following briefly describes two typical forming methods for forming the magnetic film using the sputtering technique as an example.

As an example if different kinds of magnetic materials are sputtered in a time series to form magnetic film, three kinds of target have to be prepared: a target of a high BH magnetic material having both of high saturation induction and coercive force, another target of a intermediate BH magnetic material having both of intermediate saturation induction and coercive force, and the other target of a low BH magnetic material having both of low saturation induction and coercive force. Firstly, the low BH magnetic material is sputtered to pile a first magnetic layer on the substrate. Secondly, the intermediate BH magnetic material is sputtered to pile a second magnetic layer on the first magnetic layer. Finally, the high BH magnetic material is sputtered to pile a third magnetic layer on the second magnetic layer. The completed recording medium has a staircase-like distribution of the saturation induction and coercive force where these are highest in the third magnetic layer near the surface, intermediate in the second magnetic layer, and lowest in the first magnetic layer.

As another example, if different kinds of magnetic materials are sputtered simultaneously to form magnetic film, two kinds of target have to be prepared: a target of high BH magnetic material and the other target of low BH magnetic material. The both magnetic materials are sputtered to the substrate simultaneously. In turn, applied power to the high BH magnetic material target is gradually increased with time, and conversely applied power to the low BH magnetic material target is gradually decreased with time. The high and low BH magnetic materials are piled on the substrate while their relative contents are changed. The completed magnetic medium has high content of the high BH magnetic material as it is near the surface side, while it has high content of the low BH magnetic material as it is near the substrate. As a result, the recording medium has inclined distributions of the saturation induction and coercive force that they are continuously decreased from the surface side to the substrate side.

In order to effectively obtain the recording medium having the best magnetic distribution, integrated control has to be made on the substrate temperature, deposition rate, deposition atmosphere, and other deposition conditions. For the substrate, any of known nonmagnetic material can be properly selected for use. For use in the magnetic disk, it is particularly preferable to select reinforced glass substrate, Ni-P plated Al-alloy substrate, ceramic substrate, plastic substrate, or similar nonflexible substrates. For the magnetic tape and flexible disk, it is particularly preferable to use PET (polyethylene terephthalate) substrate, polyimide substrate, or similar flexible substrates.

Strength of the leakage flux from an end of the magnetic head decreases sharply with distance from the end. In the magnetic recording, the magnetic head is kept a certain spacing above the recording medium or is directly in contact with the surface of the magnetic medium. It is therefore indispensable for effective magnetic recording to optimize corelationship between decrement of the strength of the leakage flux from the end of the magnetic head and thicknesswise micro-magnetic characteristics of the magnetic film.

In the present invention, the coercive force of the recording medium is made to decrease lower at any position than the leakage flux corresponding to the decrease of the leakage flux from the end of the magnetic head, from the surface of magnetic recording medium toward the substrate. This is a feature of the present invention as secure recording can be made and the saturation recording is accomplished. Another feature of the present invention is that as the saturation induction is made high on the surface of the magnetic recording medium and is decreased toward the substrate, the reproduced output can be made high. Another feature of the present invention relates to as the decrement of the coercive force is made greater than that of the leakage flux, stable recording can be maintained without inversion of the coercive force and the leakage flux even on the substrate side of the magnetic recording medium even if the magnetic head is vibrated up and down.

It is not always continuous to decrease the saturation induction and coercive force in the depth direction of the recording medium. Even if any of them is decreased like staircase, similar effect can be expected, provided that its average decrement exceeds the decrement of the strength of the leakage flux from the end of the magnetic head. Therefore, for example, the magnetic characteristic can be changed like staircase in any way by interleaving a multiple of nonmagnetic layers in the middle region in the depthwise direction of the recording medium. Such a staircase-like change of the magnetic characteristics, as will be described later in detail, is accomplished by forming a multilayered film which has multiples of magnetic layers and nonmagnetic layers laminated alternately.

The magnetic film may be made perpendicular magnetic film, longitudinal magnetic film, or isotropic magnetic film. If the magnetic film is formed so that the grain size in the in-plane direction should be smaller than 30 nm, disorder of magnetization in the magnetization inversion region can be minimized. This is particularly preferable for high density recording as the recording length per bit can be made short. If the grain size distribution is selected in the in-plane direction so that two times (2σ) of the dispersion should be less than 10% of the average grain size, the disorder of the magnetization in the magnetization inversion region can be further reduced and made uniform. The grain size of the magnetic film can be controlled to any value in a way that the grain sizes of the underlayer are made within a desired range by properly setting the fabrication conditions, and the magnetic layer is formed on it with use of, for example, the epitaxy phenomenon.

If recording is made with use of the magnetic film having the grain size distribution mentioned above, the disorder of the magnetization at edges of recorded tracks can be minimized. This is effective to decrease the edge noise when reproduction is made using the magnetic head, thereby increasing the reproduced signal-to-noise ratio. For the magnetic disk, if micro-grooves for magnetic separation are made on the disk-like nonmagnetic substrate in its radial and/or circular direction, the disorder of the magnetization at edges of recorded tracks can be minimized. This also is effective to decrease the edge noise when reproduction is made using the magnetic head, thereby further increasing the reproduced signal-to-noise ratio.

BRIEF DESCRIPTION OF THE DRAWINGS

Other objects and advantages of the present invention will further become apparent thereinafter and in the drawings in which:

FIG. 1 are curves of applied power density with deposition time of magnetic film;

FIG. 2 is measured characteristic curves of the saturation induction and the in-plane coercive force with magnetic film thickness for the magnetic disk given in Embodiment 1 and the one in Comparison Example 1;

DETAILED DESCRIPTION OF THE PREFERRED EMBODIMENTS

The present invention is illustrated in further detail by reference to the accompanying drawings. Compositions of alloys are abbreviated with symbols for simple representation, such as $M_1\text{-}aM_2\text{-}bM_3$. The symbol $M_1$ as used herein denotes a metal element of a main component, $M_2$ and $M_3$ are added metal elements, a and b are contents of the added metal elements in atm-%.

[Embodiment 1]

Figure 3:
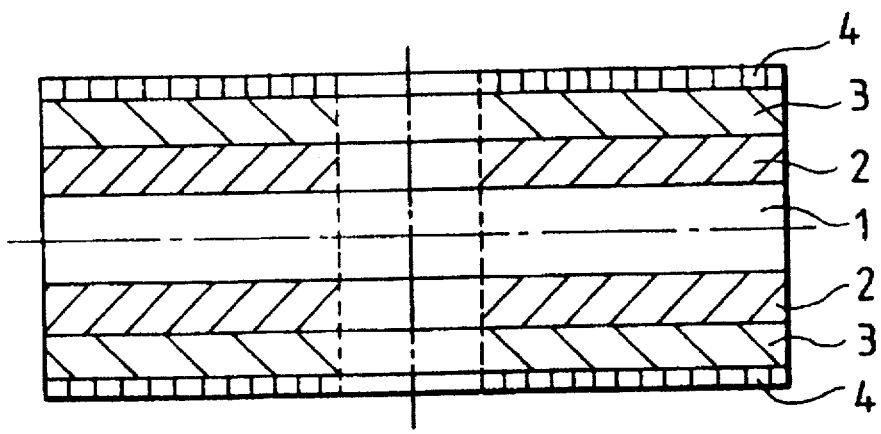
FIG. 3 is a cross sectional view of Embodiments 1, 3, and 8 of the present invention for a magnetic recording medium.

With reference now to FIG. 3, there is illustrated a cross sectional view of Embodiment 1 of the present invention for a magnetic recording medium. A magnetic disk was fabricated using a dc magnetron sputtering system which can individually sputter chrome and carbon and sputter Co-15Cr-5Ta and Co-10Cr-5Pt. Firstly, an underlayer 2 of chrome was formed to 250 nm thick on both sides of a disk-like nonmagnetic substrate 1 of 95 mm diameter and 1.5 mm thick formed of reinforced glass. Secondly, a magnetic layer 3 was formed to 100 nm thick on each of the underlayers 2. Finally, a carbon overcoat film 4 was further formed to 20 nm on each of the magnetic layers 3.

The magnetic layers 3 were formed by simultaneously sputtering the Co-15Cr-5Ta and the Co-10Cr-5Pt in conditions shown in FIG. 1 which shows curves of applied power density with deposition time of magnetic film. A substrate and an Ar gas pressure were kept 150° C. and 0.7 Pa, respectively, during period of forming the underlayers 2, the magnetic layers 3, and the carbon overcoat films 4. The applied power density to a target was 50 kW/m² when the underlayers 2 and the carbon overcoat films 4 were formed.

The completed magnetic recording medium was a longitudinal film having an easy axis in an in-lane direction. For reference, Table 1 shows magnetic characteristics of the magnetic films when the Co-15Cr-5Ta and the Co-10Cr-5Pt were individually sputtered to form the magnetic films of 100 nm thick.

TABLE 1

| Target | In-plane coercive force Hc//, Oe | Saturation induction Bs, kGauss | Applied power density |
|---|---|---|---|
| 1: Co-15Cr-5Ta | 800 | 9.42 | $P_1$ |
| 2: Co-10Cr-5Pt | 1700 | 11.6 | $P_2$ |

(Comparison Example 1)

A comparison magnetic disk was formed in the same way as in Embodiment 1 except that the magnetic layers 3 were formed of Co-12Cr-5Ta. The applied power density was kept 50 kW/m².

(Evaluation)

FIG. 2 is measured characteristic curves of the saturation induction and the in-plane coercive force with magnetic film thickness for the magnetic disk given in Embodiment 1 and the one in Comparison Example 1. Magnetic disk apparatuses were assembled of the magnetic disk given in Embodiment 1 and the one in Comparison Example 1. Table 2 shows results of evaluation of read and write characteristic of the assembled magnetic disk apparatuses. The evaluation was made using a thin film head of 0.3 μm gap length with head floated 0.2 μm up. Evaluation of write signal-to-noise ratio was made with a liner recording density of 50 kFCI and a track density of 2 kTPI. Evaluation of overwrite signal-to-noise ratio was made in terms of decrement of a reproduction signal after recording was made on the magnetic disks with the liner recording density of 18 kFCI and overwrite was made on them with that of 50 kFCI. It should be noticed that the read and write characteristics in any of the following embodiments are represented by evaluation values in the above mentioned conditions for assembled magnetic disks.

As can be seen in Table 2, the magnetic disk in Embodiment 1 is superior to that of Comparison Example 1 with respect to any of a half-output recording density $D_{50}$ which is a liner recording density with a half of the read output value at a low recording density, the read signal-to-noise ratio, and the overwrite signal-to-noise ratio. From other measurement results, the inventors also confirmed that decrements of the saturation induction and the coercive force within the magnetic film exceeded that of leakage flux of the magnetic head.

TABLE 2

| | Write and read characteristics | | |
|---|---|---|---|
| | Half-output recording density $D_{50}$, kFCI | Read signal-to-noise ratio | Overwrite signal-to-noise ratio, dB |
| Embodiment 1 | 51 | 3.1 | 35 |
| Comparison Example 1 | 42 | 2.3 | 24 |

[Embodiment 2]

Figure 4:
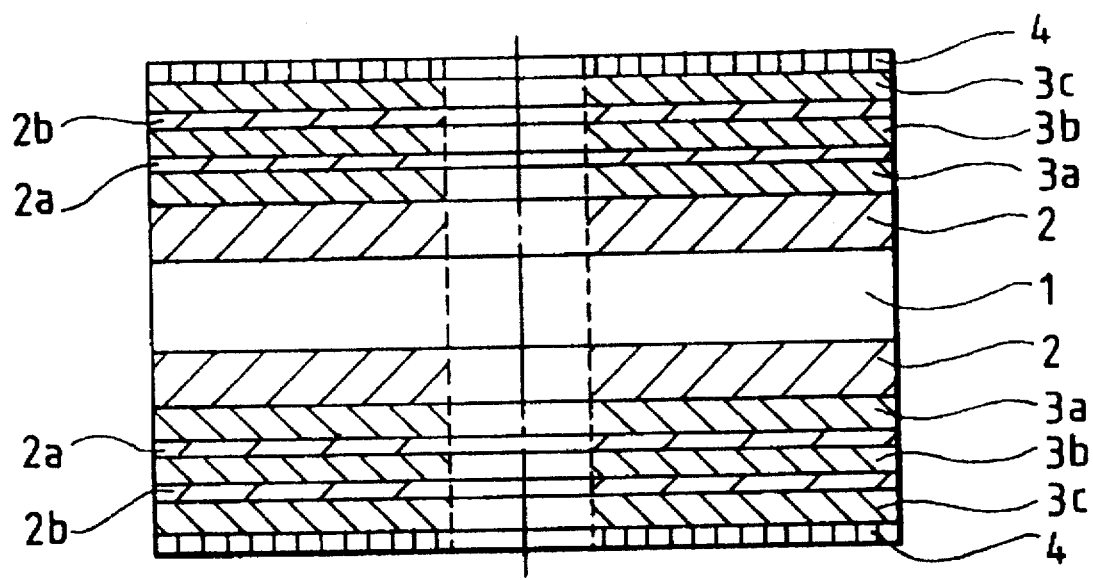
FIG. 4 illustrates a cross sectional view of Embodiments 2, 4, and 6 of the present invention for a magnetic recording medium.

With reference now to FIG. 4, there is illustrated a cross sectional view of Embodiment 2 of the present invention for a magnetic recording medium. A magnetic disk was fabricated using a dc magnetron sputtering system of in-line type. Firstly, an underlayer of chrome was formed to 250 nm thick on both sides of a disk-like nonmagnetic substrate 1 of 95 mm diameter and 1.5 mm thick made of reinforced glass. Secondly, a first magnetic layer 3a was formed of Co-15Cr-7Ta to 20 nm thick on each of the underlayers 2. Thirdly, a first interlayers 2a of chrome was formed to 10 nm thick on each of the first magnetic layers 3a. Fourthly, a second magnetic layer 3b was formed of Co-10Cr-10Pt to 30 nm thick on each of the first interlayers 2a. Fifthly, a second interlayer 2b of chrome was formed to 10 nm thick on each of the second magnetic layers 3b. Sixthly, a third magnetic layer 3c was formed of Co-15Pt to 30 nm thick on each the second interlayers 2b. Finally, a carbon overcoat film 4 was further formed to 20 nm on each of the third interlayers 3c. A substrate temperature, an Ar gas pressure, and a target applied power density were kept 150° C., 0.7 Pa and 50 kW/m², respectively. The completed magnetic recording medium was a longitudinal film having an easy axis in an in-lane direction.

(Evaluation)

Figure 5:
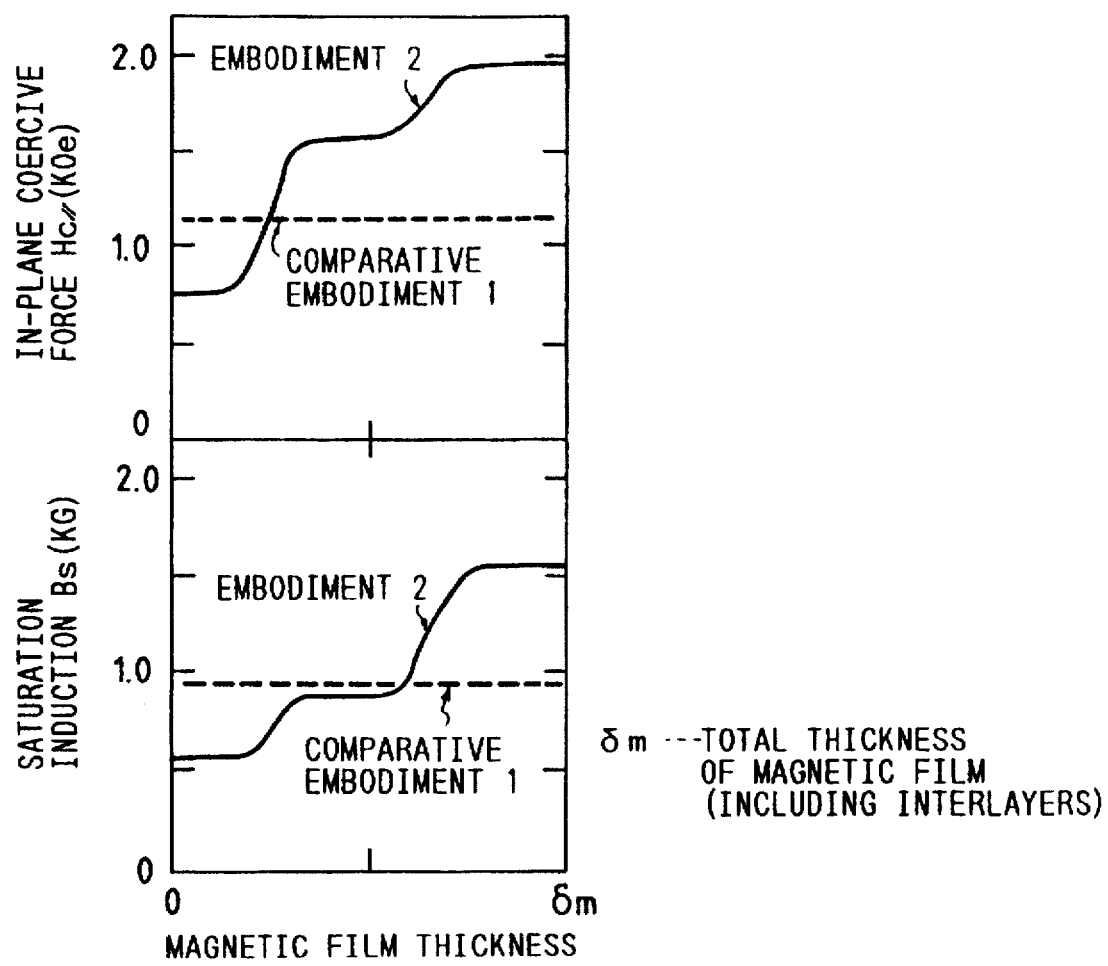
FIG. 5 is measured characteristic curves of the saturation induction and the in-plane coercive force with magnetic film thickness for the magnetic disk given in Embodiment 2 and the one in Comparison Example 1.

FIG. 5 is measured characteristic curves of the saturation induction and the in-plane coercive force with magnetic film thickness for the magnetic disk given in Embodiment 2 and the one in Comparison Example 1.

[Embodiment 3]

With reference now to FIG. 3, there is illustrated a cross sectional view of Embodiment 3 of the present invention for a magnetic recording medium. A magnetic disk was fabricated using a dc magnetron sputtering system. Firstly, a Ti-15Ta underlayer 2 was formed to 250 nm thick on both sides of a disk-like nonmagnetic substrate 1 of 95 mm diameter and 1.5 mm thick formed of reinforced glass. Secondly, a magnetic layer 3 was formed to 200 nm thick on each of the underlayers 2. Finally, a carbon overcoat film 4 was further formed to 20 nm on each of the magnetic layers 3.

The magnetic layers 3 were formed by simultaneously sputtering the Co-15V and the Co-20Cr in conditions shown in in FIG. 1 which shows curves of applied power density with deposition time of magnetic film. A substrate and an Ar gas pressure were kept 200° C. and 0.7 Pa, respectively, during period of forming the underlayers 2, the magnetic layers 3, and carbon overcoat films 4. The applied power density to a target was 50 kW/m² when the underlayer 2 and the carbon overcoat film 4 were formed.

The completed magnetic recording medium was a perpendicular film having an easy axis in a perpendicular direction. For reference, Table 3 shows magnetic characteristics of the magnetic films when the Co-15V the Co-20Cr were individually sputtered to form the magnetic films of 200 nm thick.

TABLE 3

| Target | Perpendicular coercive force Hc⊥, Oe | Saturation induction Bs, kGauss | Applied power density |
|---|---|---|---|
| 1: Co-15V | 310 | 4.14 | $P_1$ |
| 2: Co-20Cr | 720 | 7.16 | $P_2$ |

(Comparison Example 2)

A comparison magnetic disk was formed in the same way as in Embodiment 3 except that the magnetic layers 3 were formed of Co-18Cr. The applied power density was kept 50 kW/m².

(Evaluation)

Figure 6:
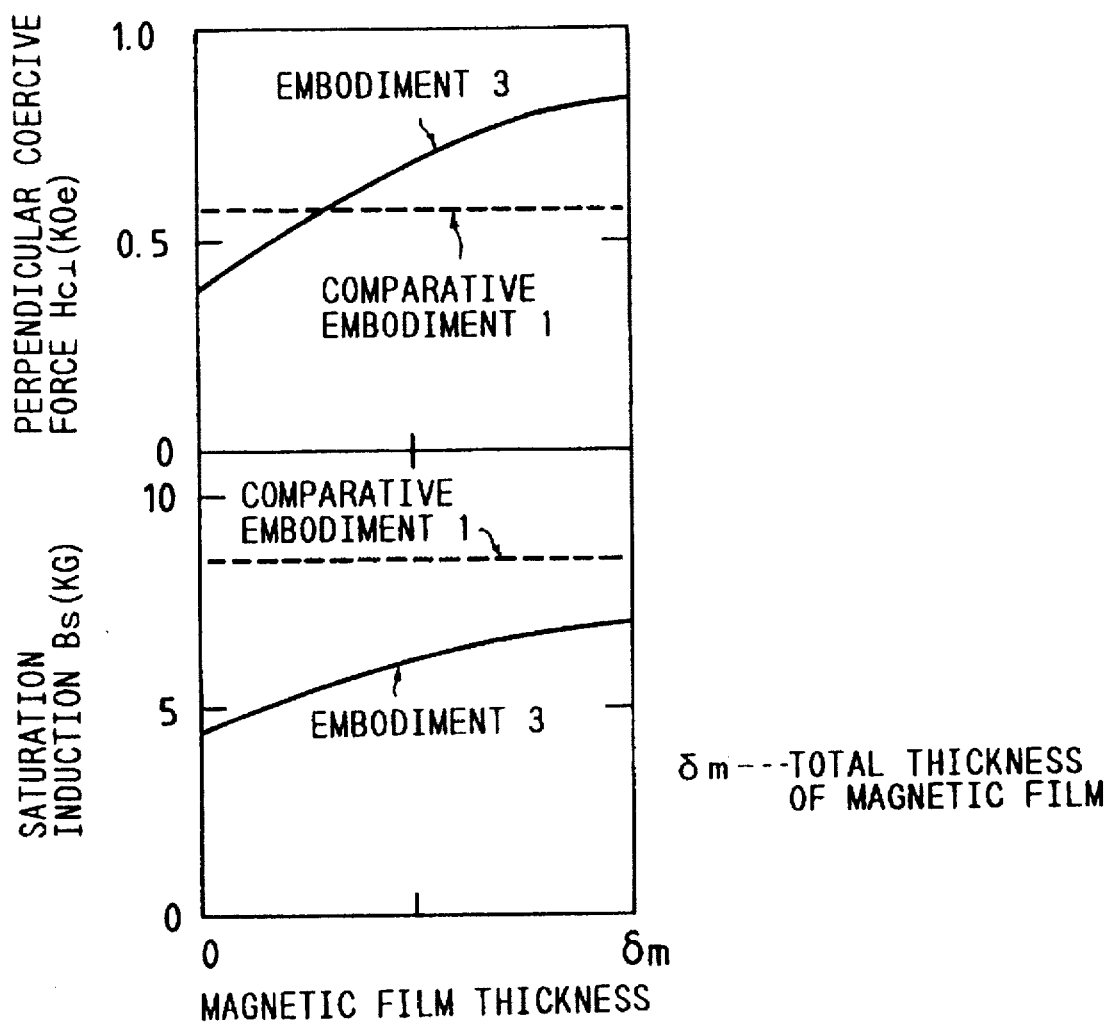
FIG. 6 is measured characteristic curves of the saturation induction and the perpendicular coercive force with magnetic film thickness for the magnetic disk given in Embodiment 3 and the one in Comparison Example 2.

FIG. 6 is measured characteristic curves of the saturation induction and the perpendicular coercive force with magnetic film thickness for the magnetic disk given in Embodiment 3 and the one in Comparison Example 2.

[Embodiment 4]

With reference now to FIG. 4, there is illustrated a cross sectional view of Embodiment 4 of the present invention for a magnetic recording medium. A magnetic disk was fabricated using a dc magnetron sputtering system of in-line type. Firstly, a germanium underlayer 2 was formed to 30 nm thick on both sides of a disk-like nonmagnetic substrate 1 of 95 mm diameter and 1.5 mm thick made of reinforced glass. Secondly, a first magnetic layer 3a was formed of Co-15V to 10 nm thick on each of the underlayers 2. Thirdly, a first interlayers 2a germanium was formed to 10 nm thick on each of the first magnetic layers first magnetic layers 3a. Fourthly, a second magnetic layer 3b was formed of Co-20Cr to 70 nm thick on each the first interlayers 2a. Fifthly, a second interlayer 2b of germanium was formed to 10 nm thick on each of the second interlayers 3b. Sixthly, a third magnetic layer 3c was formed of Co-CoO (partial oxidation) to 60 nm thick on each of the second interlayers 2b. Finally, a carbon overcoat film 4 was further formed to 20 nm on each of the third interlayers 3c. A substrate temperature, an Ar gas pressure, and a target applied power density were kept 200° C., 0.5 Pa, and 50 kW/m², respectively. The completed magnetic recording medium was a perpendicular film having an easy axis in a perpendicular direction.

(Evaluation)

Figure 7:
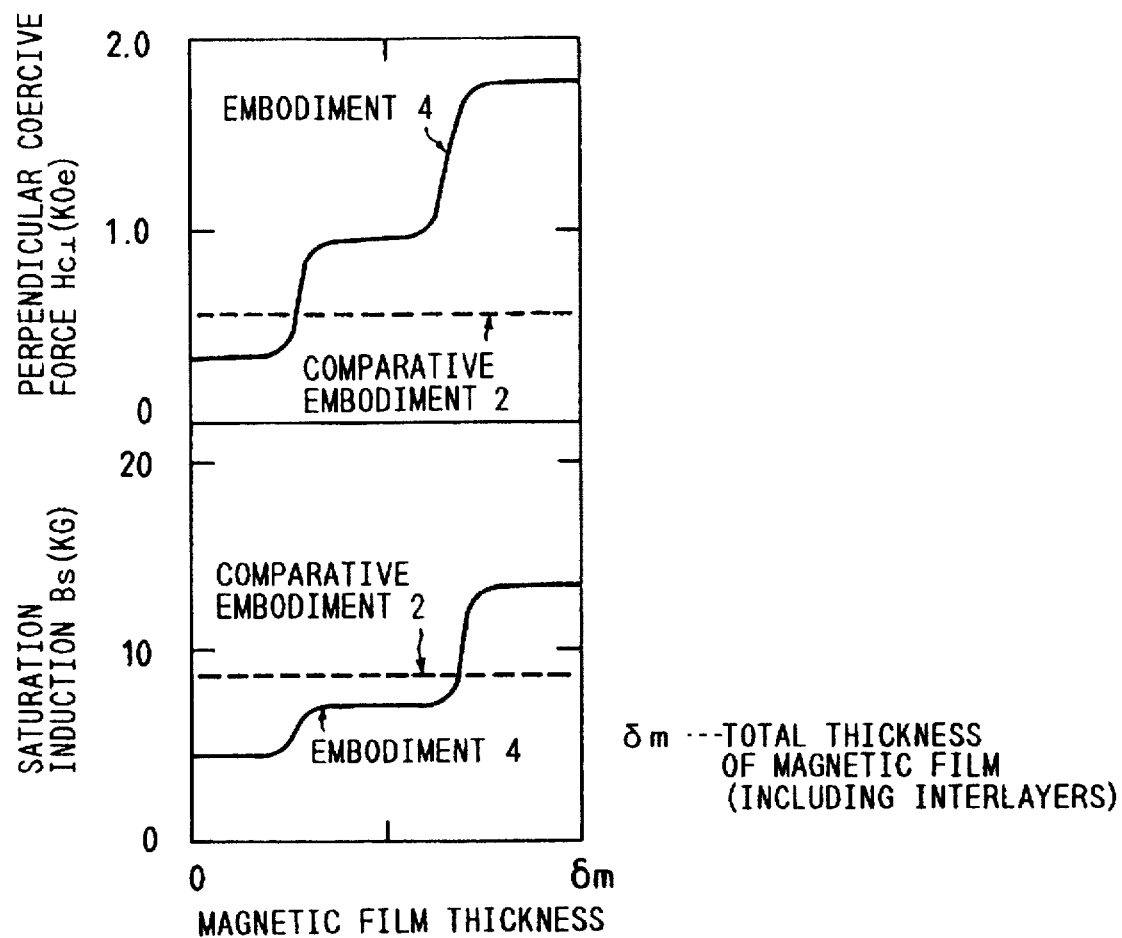
FIG. 7 is measured characteristic curves of the saturation induction and the perpendicular coercive force with magnetic film thickness for the magnetic disk given in Embodiment 4 and the one in Comparison Example 2.

FIG. 7 is measured characteristic curves of the saturation induction and the perpendicular coercive force with magnetic film thickness for the magnetic disk given in Embodiment 4 and the one in Comparison Example 2.

[Embodiment 5]

Figure 8:
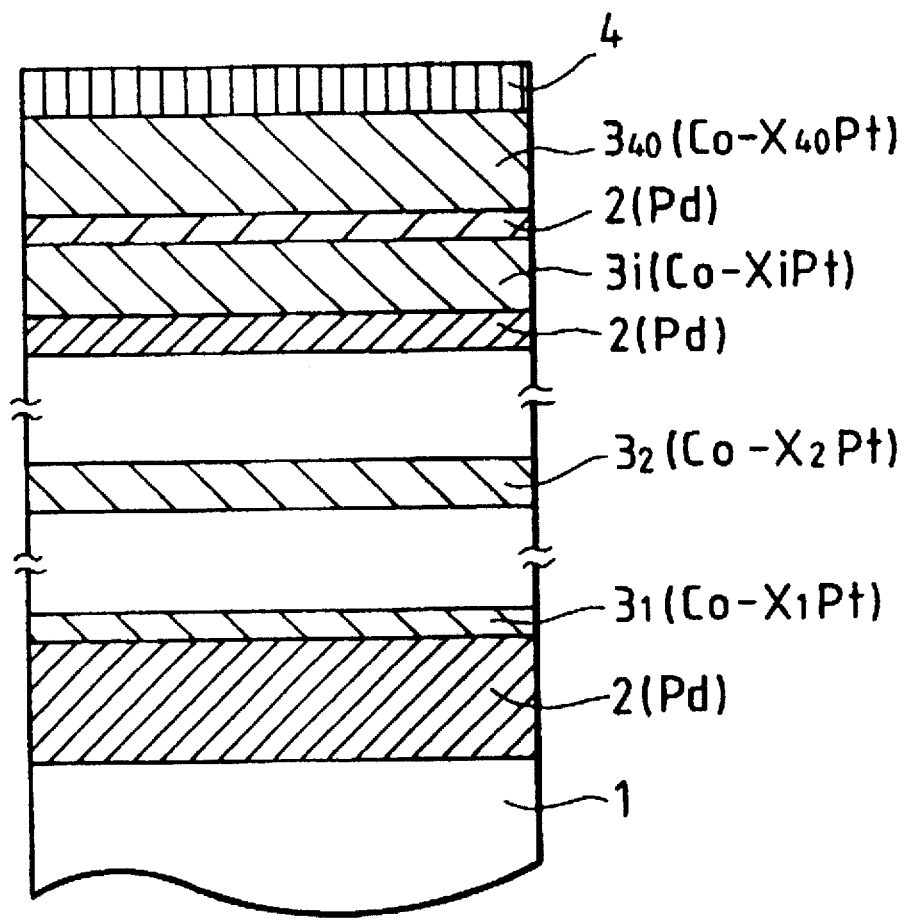
FIG. 8 is a cross sectional view of Embodiment 5 of the present invention for a magnetic recording medium of multilayered film.

With reference now to FIG. 8, there is illustrated a cross sectional view of Embodiment 5 of the present invention for a magnetic recording medium of multilayered film. A magnetic disk was fabricated using an electronic beam evaporation apparatus having three evaporation sources: cobalt, palladium, and platinum. Firstly, 40 underlayers 2 of palladium and 40 magnetic layers 3 of cobalt and platinum were alternately formed on both sides of a disk-like nonmagnetic substrate 1 of 95 mm diameter and 1.5 mm thick formed of reinforced glass. Secondly, a carbon overcoat film 4 was further formed to 20 nm on the outmost magnetic layer 3.

Forming the magnetic layers 3 was controlled by adjusting amounts of the evaporated cobalt and platinum so that composition of the ith magnetic layer counted from the substrate side should become Co-XiPt, where $Xi=18.9-0.1\times(i-1)$. Forming times for the underlayers 2 and the magnetic layers 3 were adjusted so that thickness $\delta i$ of the ith nonmagnetic layer (Pd) counted from the substrate side and thickness $\delta i$ of the ith magnetic layer (Co-Pt) should meet the following equations. The completed magnetic recording medium was a perpendicular film having an easy axis in a perpendicular direction.

$$\delta i \; (Pd) = 79.0 - 2.0 \times (i-1) \; nm, \; and$$

$$\delta i \; (Co-Pt) = 0.22 + 0.02 \times (i-1) \; nm.$$

(Evaluation)

Figure 9:
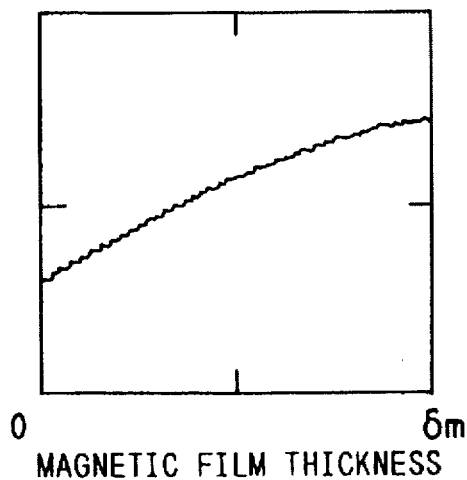
FIG. 9 is a measured characteristic curve of the saturation induction and the perpendicular coercive force with magnetic film thickness for the magnetic disk given in Embodiment 5.

FIG. 9 is a measured characteristic curve of the saturation induction and the perpendicular coercive force with magnetic film thickness for the magnetic disk given in Embodiment 5.

[Embodiment 6]

With reference now to FIG. 4, there is illustrated a cross sectional view of Embodiment 6 of the present invention for a magnetic recording medium. A magnetic disk was fabricated using a dc magnetron sputtering system of in-line type. Firstly, an underlayer 2 of chrome was formed to 250 nm thick on both sides of a disk-like nonmagnetic substrate 1 of 95 mm diameter and 1.5 mm thick made of reinforced glass. Secondly, a first magnetic layer 3a was formed of Co-21Cr to 20 nm thick on each of the underlayers 2. Thirdly, a first interlayers 2a of chrome was formed to 10 nm thick on each of the first magnetic layers 3a. Fourthly, a second magnetic layer 3b was formed of Co-19Cr to 30 nm thick on each of the first interlayers 2a. Fifthly, a second interlayer 2b of chrome was formed to 10 nm thick on each of the second magnetic layers 3b. Sixthly, a third magnetic layer 3c was formed of Co-17Cr to 30 nm thick on each the second interlayers 2b. Finally, a carbon overcoat film 4 was further formed to 20 nm on each of the third interlayers 3c.

Figure 10:
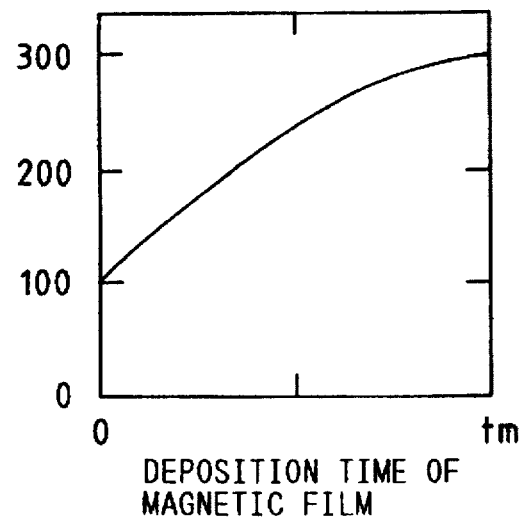
FIG. 10 is a temperature curve of the nonmagnetic substrate with growth of the magnetic layers and the interlayers.

In Embodiment 6, as shown in FIG. 10, temperature of the nonmagnetic substrate 1 was increased with growth of the magnetic layers and the interlayers. A substrate temperature was kept 100° C. during forming of the underlayers 2 and the overcoat films 4. An Ar gas pressure and a target applied power density were kept 0.7 Pa and 50 kW/m², respectively, during all the forming period. The completed magnetic recording medium was a longitudinal film having an easy axis in an in-plane direction.

(Evaluation)

Figure 11:
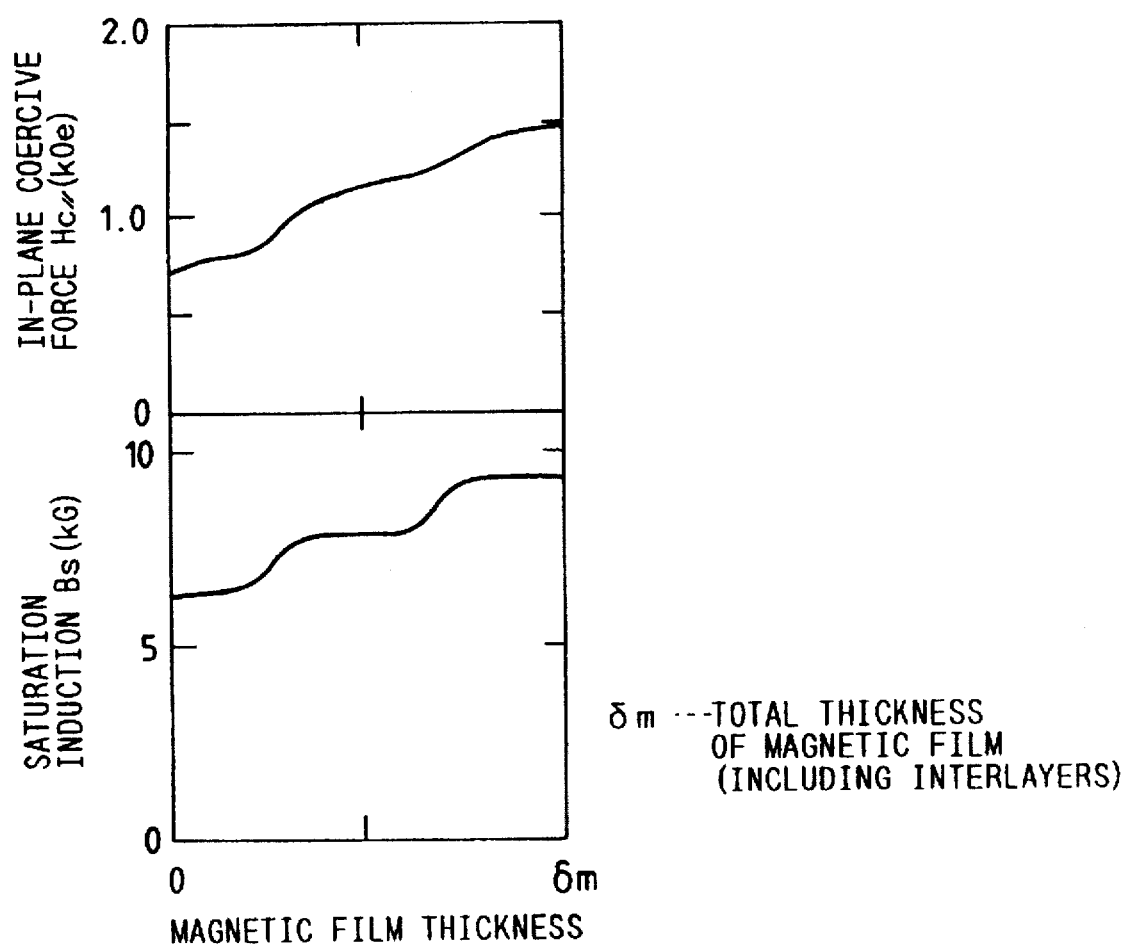
FIG. 11 is measured characteristic curves of the saturation induction and the in-plane coercive force with magnetic film thickness for the magnetic disk given in Embodiment 6.

FIG. 11 is measured characteristic curves of the saturation induction and the in-plane coercive force with magnetic film thickness for the magnetic disk given in Embodiment 6.

[Embodiment 7]

A magnetic disk was fabricated in the same way as in Embodiment 1 describe above except the underlayers 2 of chrome. In forming the underlayers 2 of chrome, a substrate temperature, a target applied power density, an Ar gas pressure were adjusted so that an average grain size d on their surfaces and a ratio $(2\sigma/d)$ of two times dispersion $(2\sigma)$ of the grain size distribution to the average grain size d should take various values as shown in Table 4.

(Evaluation)

Table 4 shows results of measurement of half-output recording density $D_{50}$ and read signal-to-noise ratio of the magnetic disk in Embodiment 7. For reference, the table also shows the magnetic characteristics of Comparison Example 1 on the right column. As seen in the table, if the average grain size d on the underlayers of chrome is smaller than 30 nm, the write and read characteristics were obtained as the half-output recording density $D_{50}$ was higher than 50 kFCI and the signal-to-noise ratio is higher than 3. From other measurement results, the inventors confirmed that if the value $2\sigma/d$ was selected less than 10%, further good characteristics were obtained even with the same average grain size d.

TABLE 4

| Sample No. | 1 | 2 | 3 | 4 | 5 | 6 | 7 | 8 | 9 | 10 | Comparison Example 1 |
|---|---|---|---|---|---|---|---|---|---|---|---|
| Average grain size d, (Å) | 210 | 215 | 270 | 278 | 295 | 350 | 370 | 345 | 570 | 610 | 298 |
| 2 σ/d × 100 | 8 | 15 | 5 | 10 | 18 | 7 | 14 | 20 | 9 | 18 | 15 |
| Half-output recording density $D_{50}$, kFCI | 55 | 53 | 53 | 52 | 50 | 48 | 47 | 46 | 42 | 37 | 51 |
| Read signal-to-noise ratio | 4.2 | 4.0 | 4.1 | 3.6 | 3.1 | 3.1 | 2.8 | 2.4 | 2.6 | 2.2 | 3.1 |

[Embodiment 8]

With reference now to FIG. 3, there is illustrated a cross sectional view of Embodiment 8 of the present invention for a magnetic recording medium. A magnetic disk was fabricated using a dc magnetron sputtering system. Firstly, an underlayer 2 of chrome was formed to 250 nm thick on both sides of a disk-like nonmagnetic substrate 1 of 95 mm diameter and 1.5 mm thick formed of reinforced glass. Secondly, a magnetic layer 3 was formed to 100 nm thick on each of the underlayers 2. Finally, a carbon overcoat film 4 was further formed to 20 nm on each of the magnetic layers 3.

The magnetic layers 3 were formed by simultaneously sputtering the Tb-77Fe-5Co and the Tb-64Fe-3Co in conditions shown in. FIG. 1 which shows curves of applied power density with deposition time of magnetic film. A substrate and an Ar gas pressure were kept 150° C. and 0.7 Pa, respectively, during period of forming the underlayers 2, the magnetic layers 3, and the carbon overcoat films 4. The applied power density to a target was 50 kW/m$^2$ when the underlayers 2 and the carbon overcoat films 4 were formed.

The completed magnetic recording medium was a perpendicular film having an easy axis in a perpendicular direction. After evaluation of the formed magnetic layers 3 in an X ray diffraction analysis, the inventors determined that their structure was amorphous as no distinct diffraction peaks were observed. Table 5 shows magnetic characteristics of the magnetic films when the Tb-77Fe-5Co and the Tb-64Fe-3Co were individually sputtered to form the magnetic films of 100 nm thick.

TABLE 5

| Target | Perpendicular coercive force Hc⊥, Oe | Saturation induction Bs, kGauss | Applied power density |
|---|---|---|---|
| 1: Tb-77Fe-5Co | 1.1 | 2.4 | P$_1$ |
| 2: Tb-64Fe-3Co | 1.9 | 2.6 | P$_2$ |

(Evaluation)

Figure 12:
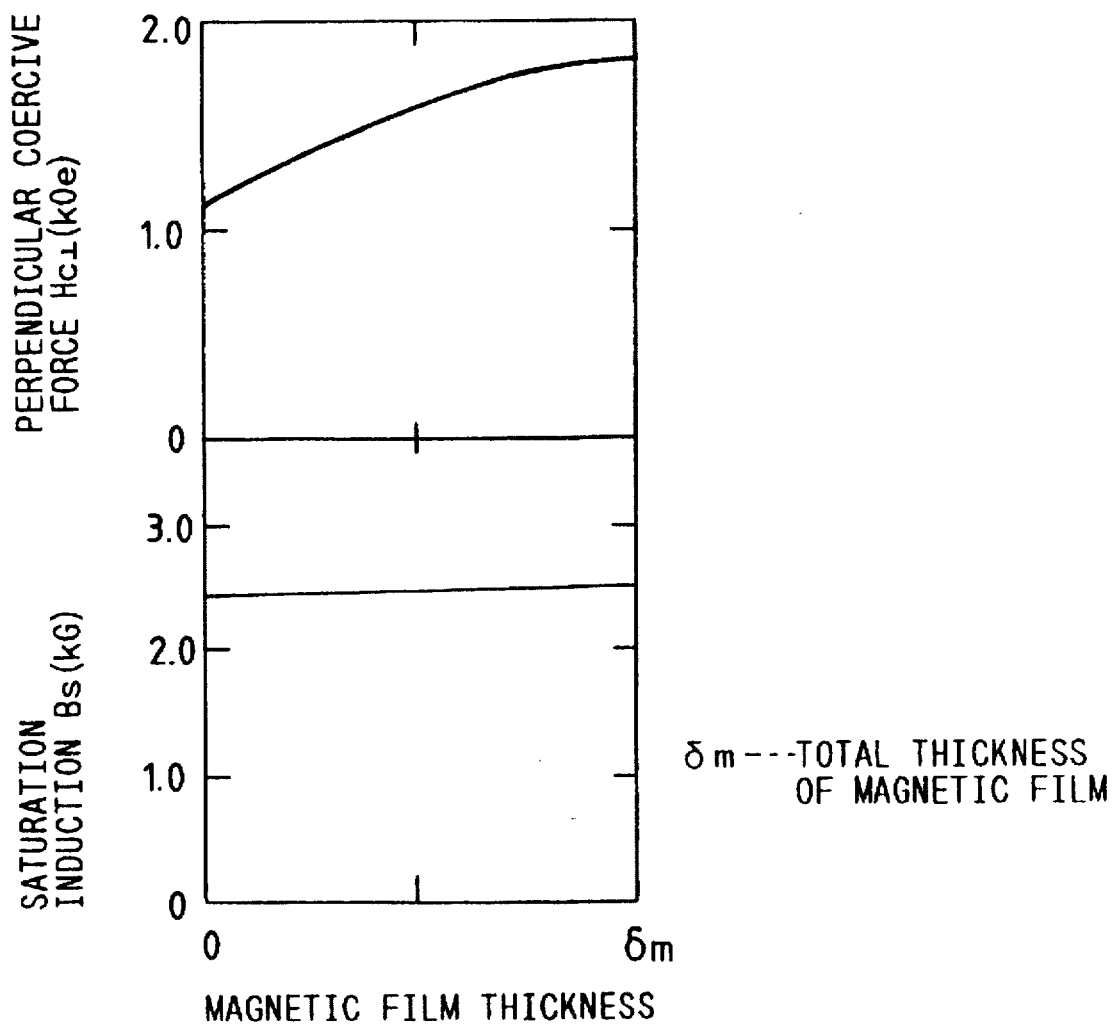
FIG. 12 is measured characteristic curves of the saturation induction and the perpendicular coercive force with magnetic film thickness for the magnetic disk given in Embodiment 8.

FIG. 12 is measured characteristic curves of the saturation induction and the perpendicular coercive force with magnetic film thickness for the magnetic disk given in Embodiment 8 and the one in Comparison Example 1.

[Embodiment 9]

Figure 13:
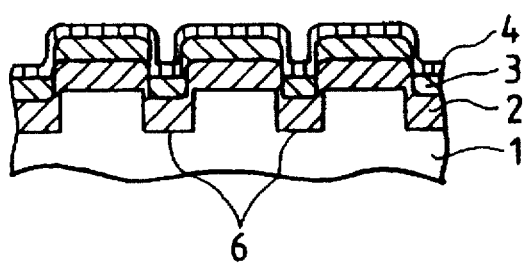
FIG. 13 is a cross sectional view of Embodiment 9 of the present invention for a magnetic recording medium.

With reference now to FIG. 13, there is illustrated a cross sectional view of Embodiment 9 of the present invention for a magnetic recording medium. A magnetic disk was fabricated using a photorithographic technique. Firstly, concentric magnetic separation grooves 6 were formed to 300 nm and 5 μm wide at intervals of 15 μm in a range of 40 to 85 mm diameter on both sides of a disk-like nonmagnetic substrate 1 of 95 mm diameter and 1.5 mm thick formed of reinforced glass. Secondly, the nonmagnetic substrate had underlayers 2 of chrome, magnetic layers 3 having an easy axis in a in-plane direction, and carbon overcoat films 4 formed thereon in the same way as in Embodiment 1.

(Evaluation)

Table 6 shows measurement results of write and read characteristics of the grooved magnetic disk given in Embodiment 9 and the no-grooved magnetic disk in Embodiment. For evaluation, write and read were made on concentric convexes of 10 μm wide formed between the adjacent grooves with use of a film magnetic head having 12 μm track width.

TABLE 6

| Write and read characteristics | Embodiment 9 | Comparison Example (Embodiment 1) |
|---|---|---|
| Half-output recording density D$_{50}$, kFCI | 51 | 51 |
| Read signal-to-noise ratio | 3.5 | 3.1 |

As described in detailed so far, in the recording medium having the magnetic film formed on the nonmagnetic substrate directly or via the underlayer, the reproduced signal-to-noise ratio can be improved to a great extent in the high density recording by decreasing the saturation induction and coercive force from the surface side of the recording medium toward the substrate. As a result, the linear recording density can be improved greatly to as high as 50 kFCI even if the spacing between the end of the magnetic head and the surface of the magnetic recording medium is around 0.2 μm.

The evaluations of the present invention were made when the spacing between the end of the magnetic head and the surface of the magnetic recording medium was around 0.2 μm. It need hardly be said that more desirable results can be obtained by applying the magnetic medium of the present invention to the spacing of 0.04 μm disclosed in, for example, the "IEEE Trans. Mag., Vol. 26 (1990), pp.2271-2276".

The magnetic recording medium of the present invention is available in a variety of applications, such as a magnetic disk apparatus, magnetic tape apparatus, flexible disk apparatus, and other similar magnetic recording apparatuses. Also, the present invention is available for any of the perpendicular magnetic film, in-plane magnetic film, and isotropic magnetic film having an intermediate characteristic of the both.

The foregoing description has been made mainly on polycrystal magnetic thin film. Instead, amorphous magnetic thin film can be used and similar effects can be naturally expected as long as the saturation induction and coercive force are decreased to the conditions mentioned above.

What is claimed is:

1. A magnetic recording medium which has at least two magnetic layers of thin film formed on a nonmagnetic substrate directly or via an underlayer, characterized in that easy axes of the at least two magnetic layers are oriented in the same direction, and both saturation induction and coercive force in the easy axis direction decrease from a surface of the magnetic recording medium to the nonmagnetic substrate.

2. A magnetic recording medium according to claim 1, characterized in that among the least two magnetic layers of thin film, the thin film magnetic layer positioned on a surface side of the magnetic recording medium is formed of a magnetic material being highest both in the saturation induction and the coercive force in the easy axis direction relative to the other layers, and the magnetic layer positioned on the nonmagnetic substrate side is formed of a magnetic material being lowest both in the saturation induction and the coercive force in the easy axis direction relative to the other layers.

3. A magnetic recording medium according to claim 2, characterized in that there are at least three magnetic layers, and the saturation induction and the coercive force in the easy axis direction of the magnetic layers decrease from a one of the layers most closely adjacent the surface to another of the layers most closely adjacent the nonmagnetic substrate.

4. A magnetic recording medium according to claim 1, characterized in that said magnetic layers of thin film are formed of a mixture of two magnetic materials, a one of the two magnetic materials is higher than the other of the two magnetic materials both in the saturation induction and the coercive force in the easy axis direction and the other of the two magnetic materials is lower than said one of the two magnetic materials both in the saturation induction and the coercive force in the easy axis direction, a composition ratio of the two magnetic materials being controlled so that the magnetic film has more relative content of said one of the two magnetic materials on the surface side of the magnetic recording medium and has more relative content of said other of the two magnetic materials on the nonmagnetic substrate side.

5. A magnetic recording medium according to claim 1, characterized in that there are at least three magnetic layers and a plurality of nonmagnetic layers laminated alternately with the magnetic layers, thicknesses of the magnetic layers are monotonically thinner from a surface of the recording medium to the nonmagnetic substrate, and thicknesses of the nonmagnetic layers are monotonically thicker from the surface to the nonmagnetic substrate.

6. A magnetic recording medium according to claim 1, characterized in that the magnetic thin film is one of perpendicular magnetic film, in-plane magnetic film, and isotropic magnetic film.

7. A magnetic recording medium according to claim 6, characterized in that the magnetic thin film has a grain size less than 30 nm in an in-plane direction of the magnetic film.

8. A magnetic recording medium according to claim 6, characterized in that the magnetic thin film has a dispersion of a grain size distribution, which dispersion multiplied by two is within 10% of an average grain size of the magnetic thin film.

9. A magnetic recording medium according to claim 6, characterized in that the magnetic film is polycrystaline.

10. A magnetic recording medium according to claim 6, characterized in that the magnetic film is amorphous.

11. A magnetic recording medium according to claim 1, characterized in that the nonmagnetic substrate is circular and periodical magnetic separation grooves are formed in at least one of a radial and circular directions of the magnetic film.

12. A magnetic recording medium comprising:
a magnetic recording medium having:
a nonmagnetic substrate,
a base magnetic thin film supported on the nonmagnetic substrate,
a surface magnetic thin film supported over the base thin film, an easy axis of each of the base and surface magnetic thin films being oriented in the same direction, and both saturation induction and coercive force along the easy axis of the base magnetic thin film being lower than saturation induction and coercive force along the easy axis of the surface magnetic thin film.

13. The magnetic recording medium according to claim 12 further including a middle magnetic thin film disposed between the base magnetic thin film and the surface magnetic thin film, the middle magnetic thin film having an easy axis oriented in the same direction as the easy axes of the base and surface magnetic thin films, the middle magnetic thin film having a saturation induction and a coercive force along the easy axis which are less than the saturation induction and coercive force of the surface magnetic thin film along the easy axis and which is greater than the saturation induction and coercive force of the base magnetic thin film along the easy axis.

14. The magnetic recording medium according to claim 13 further including a first nonmagnetic thin film layer disposed between the surface and middle magnetic thin films and a second nonmagnetic thin film disposed between the middle and base magnetic thin films and wherein the middle magnetic thin film is thinner than the surface magnetic thin film and the base magnetic thin film is thinner than the middle magnetic thin film.

15. A magnetic recording medium characterized in that it has a recording film having a plurality of magnetic layers of thin film and a plurality of nonmagnetic layers of thin film laminated alternately with the magnetic layers, thicknesses of the magnetic layers of thin film are monotonically thinner from a surface of the recording film to a nonmagnetic substrate, each of the magnetic layers of thin film having an easy axis, the easy axes of the magnetic layers of thin film being oriented in a common direction, saturation induction of the magnetic layers of thin film in the easy axis direction decreases from the surface of the recording film to the nonmagnetic substrate, and coercive forces of the magnetic layers of thin film in the easy axis direction decrease from the surface of the recording film to the nonmagnetic substrate.

* * * * *